(12) United States Patent  
Wann et al.

(10) Patent No.: US 12,333,889 B2
(45) Date of Patent: *Jun. 17, 2025

(54) FOOD PREPARATION APPARATUS HAVING A VIRTUAL DATA BUS

(71) Applicant: Duke Manufacturing Co., St. Louis, MO (US)

(72) Inventors: Benjamin Kingbay Wann, Kirkwood, MO (US); Charles Jesse James, Collinsville, IL (US); Anthony James Regna, Imperial, MO (US)

(73) Assignee: DUKE MANUFACTURING CO., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,287

(22) Filed: Apr. 19, 2024

(65) Prior Publication Data

US 2024/0346873 A1    Oct. 17, 2024

Related U.S. Application Data

(63) Continuation of application No. 16/764,318, filed as application No. PCT/US2018/061844 on Nov. 19, 2018, now Pat. No. 11,967,196.

(Continued)

(51) Int. Cl.
```
G07F 17/00        (2006.01)
A47J 36/32        (2006.01)
G06F 13/36        (2006.01)
```
(52) U.S. Cl.
CPC ........ *G07F 17/0064* (2013.01); *A47J 36/321* (2018.08); *G06F 13/36* (2013.01)

(58) Field of Classification Search
CPC .... G07F 17/0064; A47J 36/321; G06F 13/36; G06Q 10/08
See application file for complete search history.

(56) References Cited

U.S. PATENT DOCUMENTS 7,523,302 B1    4/2009 Brown et al.
11,610,276 B1 * 3/2023 Cohen .............. G06Q 10/06316
(Continued)

FOREIGN PATENT DOCUMENTS

KR    1020130023599 A    3/2013
WO    2011/002766 A1     1/2011
(Continued)

OTHER PUBLICATIONS

Wikipedia: Publish-suscribe Pattern, https://en.wikipedia.org/w/index.php?title=publish%E2%80%93subsribe_pattern&oldid=803292474, Oct. 1, 2017, retrieved on Jan. 21, 2029, 5 pages.
(Continued)

*Primary Examiner* — Ziaul Karim
(74) *Attorney, Agent, or Firm* — Stinson LLP

(57) ABSTRACT

A food preparation appliance and associated components and methods. The food preparation appliance is configured to support transmission of operations updates and other data to/from a local or remote computer. In some embodiments, the food preparation appliance provides a virtual data bus for transmission of the updates or data. The virtual data bus may be bridged to a physical data bus of the food preparation appliance. The food preparation appliance can be configured to receive operations updates regardless of an operational mode of the food preparation appliance.

23 Claims, 9 Drawing Sheets

Related U.S. Application Data

(60) Provisional application No. 62/587,574, filed on Nov. 17, 2017.

(56) References Cited

U.S. PATENT DOCUMENTS

| | | | |
|---|---|---|---|
| 2003/0083758 A1 | 5/2003 | Williamson | |
| 2003/0084047 A1* | 5/2003 | Williamson | G06Q 10/10 |
| 2010/0325282 A1* | 12/2010 | Oshins | G06F 9/45558 |
| | | | 718/1 |
| 2012/0323392 A1 | 12/2012 | Gerdes et al. | |
| 2013/0220143 A1* | 8/2013 | Fetterman | A47J 27/10 |
| | | | 99/330 |
| 2014/0040055 A1 | 2/2014 | Quartarone et al. | |
| 2015/0074237 A1* | 3/2015 | Unagami | H05B 6/6435 |
| | | | 709/219 |
| 2015/0129666 A1* | 5/2015 | Butler | G06K 19/073 |
| | | | 235/492 |
| 2015/0130593 A1* | 5/2015 | Mats | G06K 7/0008 |
| | | | 340/10.1 |
| 2016/0059412 A1* | 3/2016 | Oleynik | B25J 19/02 |
| | | | 700/250 |
| 2016/0174748 A1 | 6/2016 | Baldwin et al. | |
| 2017/0134255 A1 | 5/2017 | Amini et al. | |
| 2017/0139385 A1 | 5/2017 | Young et al. | |
| 2018/0048481 A1 | 2/2018 | Wann et al. | |
| 2018/0081331 A1 | 3/2018 | Gary, Jr. et al. | |

FOREIGN PATENT DOCUMENTS

| | | |
|---|---|---|
| WO | 2013/134830 A1 | 9/2013 |
| WO | 2015/135031 A1 | 9/2015 |

OTHER PUBLICATIONS

Wikipedia, I/ O virtualization|, https://en.wikipedia.org/w/index.php?title=I/O_virtualization&oldid=745559319, Oct. 21, 2017, retrieved on Jan. 21, 2029, 3 pages.

International Search Report dated Jan. 29, 2019 relating to PCT Application No. PCT/US2018/061844, 6 pages.

Written Opinion dated Jan. 29, 2019 relating to PCT Application No. PCT/US2018/061844, 8 pages.

* cited by examiner

FIG. 7

| | Name |
|---|---|
| Edit | Full Bake |
| Edit | Full Bake W/Cheese |
| Edit | Half Bake |
| Edit | Half Bake W/Cheese |
| Edit | Full Cookies |
| Edit | Half Cookies |
| Edit | Cool Down |

Export

Flex Bake 5

| Recipe Generator |
|---|
| Current Data |
| Settings |

Is there a new Recipe? ☑

Download

FOOD PREPARATION APPARATUS HAVING A VIRTUAL DATA BUS

CROSS-REFERENCE TO RELATED APPLICATIONS

This application is a continuation of U.S. patent application Ser. No. 16/764,318, filed May 14, 2020, which is a U.S. national stage application of International Application No. PCT/2018/061844, filed Nov. 19, 2018, which claims priority from U.S. Provisional Patent Application No. 62/587,574, filed Nov. 17, 2017, the entire disclosures of which are incorporated herein by reference.

FIELD

The present disclosure generally relates to a food preparation apparatus, and more particularly to a food preparation apparatus configured to communicate via a virtual data bus.

BACKGROUND

Food preparation establishments such as restaurants, including quick service or fast food restaurants, have kitchens including food preparation apparatuses that can store recipes for controlling operations of the apparatus. Conventional techniques for updating the recipes (e.g., downloading recipe updates from a flash drive, etc.) present several challenges. For example, physically transporting the memory device on which the updates are stored is cumbersome and time-consuming. Creating multiple copies and instructing others (e.g., employees) to perform the updating is unreliable. Moreover, conventional techniques for accessing a food preparation apparatus with a separate computing device require the ability to communicate information about the current functional mode of the apparatus to the computing device so that changes do not interfere with the current functional mode.

SUMMARY

A food preparation apparatus embodying aspects of the invention permits a user of a separate computer to initiate operations updates. To do so, the food preparation apparatus utilizes a virtual data bus and memory scheme to receive operations updates regardless of the current functional mode of the apparatus.

In an embodiment, a food preparation apparatus comprises a single board computer including a first processor, and a memory communicatively coupled to the first processor. The memory stores processor-executable instructions that, when executed by the first processor, provide: a state machine, a web server, and a virtual data bus communicatively coupling the state machine and the web server. The food preparation apparatus includes an operations controller communicatively coupled to the single board computer and configured to receive information from the web server for controlling an operation of the food preparation apparatus.

In another embodiment, a food preparation apparatus comprises a physical data bus and a communications processor communicatively coupled to the physical data bus. The communications processor communicates on the physical data bus via a publish/subscribe protocol. A first memory device is communicatively coupled to the communications processor. The first memory device stores processor-executable instructions that, when executed by the communications processor: create a virtual data bus for transmitting publish/subscribe protocol communications, and execute a web server communicatively coupled to the virtual data bus and configured to enable at least one of a local computer or a remote computer to transmit publish/subscribe protocol communications via the virtual data bus, and execute a state machine configured to bridge the virtual data bus and the physical data bus for transmitting the publish/subscribe protocol communications from the virtual data bus to the physical data bus.

Other objects and features of the present invention will be in part apparent and in part pointed out herein.

BRIEF DESCRIPTION OF THE DRAWINGS

FIGS. 7-9 are exemplary graphical user interfaces embodying aspects of the present invention.

Corresponding reference characters indicate corresponding parts throughout the drawings.

DETAILED DESCRIPTION

Figure 1:
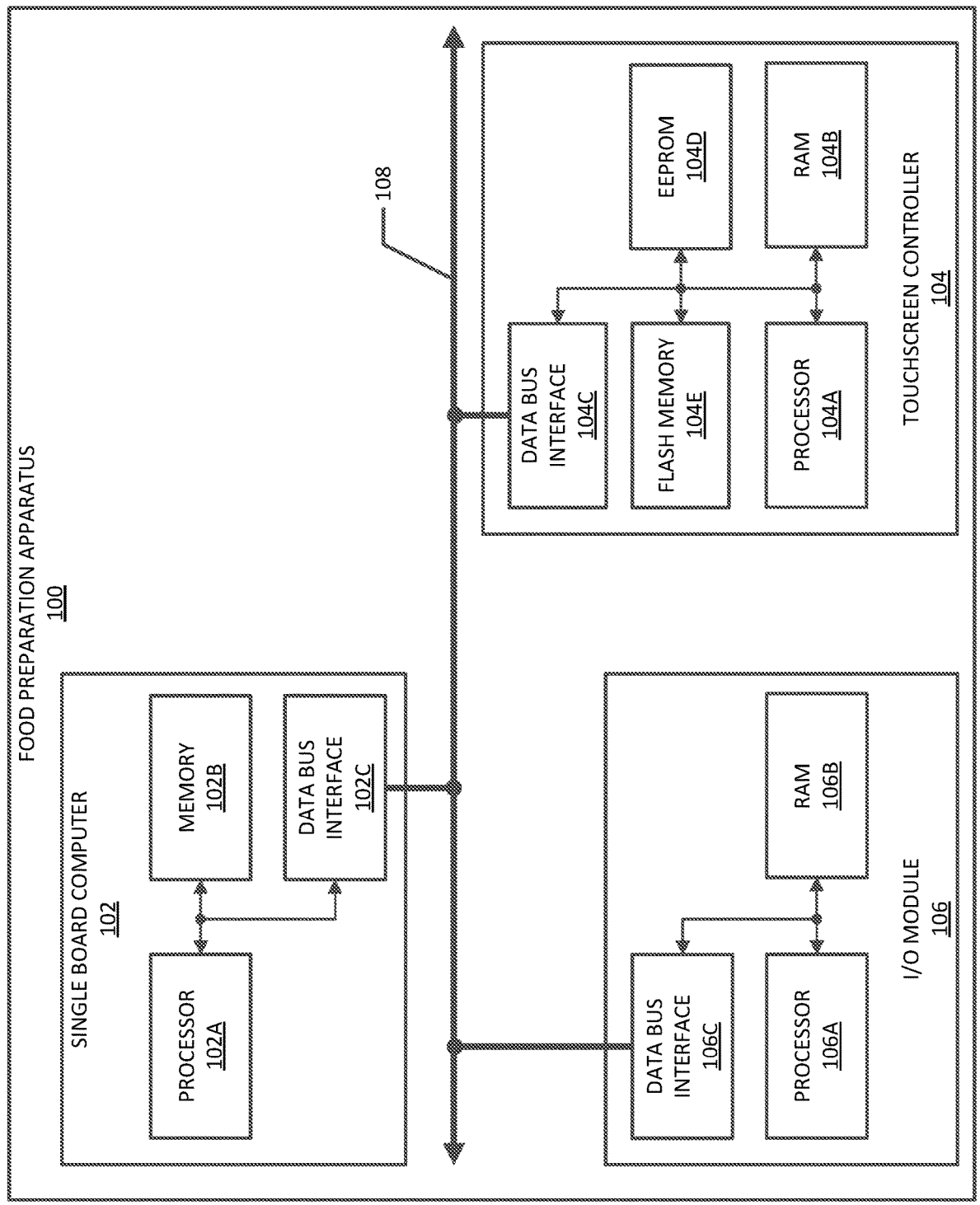
FIG. 1 is a diagram of a food preparation apparatus embodying aspects of the present invention.

Referring to the drawings, FIG. 1 illustrates one embodiment of a food preparation apparatus 100 embodying aspects of the present invention. In the illustrated example, the food preparation apparatus 100 is configured as a food preparation apparatus for use in a food preparation establishment, such as a restaurant or other commercial kitchen, including a quick service or "fast food" restaurant. In an aspect, food preparation apparatus 100 comprises, in part, a food preparation establishment network system used for "smart kitchen" purposes such as forecasting or predicting food that will be ordered in the future, preparing food, monitoring food preparation and food inventory, providing indications and instructions regarding food preparation and food inventory, labor scheduling management, asset tracking, smart appliance communication, sensor network integration, global inventory control, and facilitating communications between devices in the network for these and other purposes.

The food preparation apparatus 100 may include various food cooking devices. An example of one such cooking device is an oven, and it will be understood that other cooking devices, such as fryers, microwaves, conditioning cabinets (e.g. for dough, etc.), grills, and the like can be used without departing from the scope of the present invention. The food preparation apparatus 100 may also include a food holding apparatus such as one or more food holding units adapted for holding food at a suitable temperature (e.g., cool temperature, ambient temperature, and/or warm temperature) such as a steam table, an infrared holding unit, a heat sink holding unit, or other holding unit, etc. The food preparation apparatus 100 may also include various other food handling apparatus such as food washers, sanitizers, or processors, etc. In an embodiment, apparatus 100 has a plurality of functional modes (i.e., "states"). Exemplary states of apparatus 100 include OFF, IDLE, PRE-HEAT, RUN, and DIAGNOSTICS.

Referring still to FIG. 1, the apparatus 100 in the illustrated embodiment includes a single board computer 102, a touchscreen controller 104, and an I/O module 106. The single board computer 102 includes a processor 102A, a memory 102B, and a data bus interface 102C. The touchscreen controller 104 includes a processor 104A, a flash data memory (RAM) 104B, a data bus interface 104C, and an electronically erasable programmable read-only memory (EEPROM) 104D. The I/O module 106 includes a processor 106A, a flash data memory 106B, and a data bus interface 106C. The single board computer 102, touchscreen controller 104, and I/O module 106 are communicatively coupled to each other, via their respective data bus interfaces 102C, 104C, 106C, through a physical data bus 108. In another embodiment, the single board computer 102 and touchscreen controller 104 could be embodied on the same printed circuit board, in which case a physical data bus may not be used for communication between the single board computer and the touchscreen controller.

The single board computer 102 is configured to bridge the physical data bus 108 with a virtual data bus, store recipes, and provide, via a web server, a graphical user interface (GUI) for enabling a user of a client computer to configure recipe settings and/or firmware settings for food preparation apparatus 100, as further described herein. The single board computer 102 provides a core app, a web server, a database, and a virtual communication bus via a software environment (e.g., processor 102A executing processor readable instructions stored on memory 102B, etc.), as further described herein. An exemplary single board computer is available from DAVE Embedded Systems. In an embodiment, the processor 102A comprises an ARM based CPU running at speeds of about 500 Mhz to 1 GHz and memory 102B comprises 1 GB of random access memory (RAM) (broadly "non-transitory computer-readable storage medium"). The data bus interface 102C may comprise a single board computer with various wireline protocol interconnects, such as, Serial Peripheral Interface (SPI), I2C (I2C), Controller Area Network (CAN), RS-485, RS-232, and have several (e.g., sixty or more) general purpose input/output pins at any data transmission rate. The memory 102B is configured to store recipe updates (broadly, "operations updates") in a human-readable format but could alternatively store the updates in non-human-readable format. The single board computer 102 may be referred to as an embedded computing device, an embedded computer, an embedded control device, and/or an embedded controller in accordance with one or more aspects of the disclosure.

The touchscreen controller 104 (broadly, "operations controller") is configured to control a touch screen display device of food preparation apparatus 100, control operations of food preparation apparatus 100, and store default recipes. In an embodiment, touchscreen controller 104, as a human-machine interface, generates and provides a GUI for enabling a user of apparatus 100 to view and/or select recipes capable of being carried out by apparatus 100, settings of apparatus 100, and/or data regarding usage and/or fault conditions of apparatus 100. An exemplary touchscreen controller includes a TSC2 touchscreen controller available from Siemens Mfg. In an embodiment, the processor 104A comprises an PIC microcontroller running at speeds of 80 MHZ, RAM 104B comprises 120 KB of RAM, and EEPROM 104D comprises 512 KB of program memory (e.g., program and flash). Additionally, touchscreen controller 104 may include flash memory (e.g., NAND flash memory) 104E configured for graphics bitmap storage. In an embodiment, one or more of the memory of touchscreen controller 104 may be broadly referred to as a "non-transitory computer-readable storage medium." The data bus interface 104C may comprise a single board computer with various wireline protocol interconnects, such as, Serial Peripheral Interface (SPI), I2C (I2C), Controller Area Network (CAN), RS-485, RS-232, and have several (e.g., sixty or more) general purpose input/output pins.

The I/O module 106 is configured to control various loads (e.g., heaters, valves, fans, etc.) in apparatus 100 based on commands from touchscreen controller 104. An exemplary I/O module includes a 103 board available from Siemens Mfg.

The physical data bus 108 is configured to facilitate the exchange of data among single board computer 102, touchscreen controller 104, and I/O module 106. The single board computer 102, touchscreen controller 104, and I/O module 106 are configured to publish messages (e.g., data) to the physical data bus 108 and subscribe to messages on the physical data bus 108. In this manner, single board computer 102, touchscreen controller 104, and I/O module 106 are configured to communicate via a publish/subscribe ("pub/sub") protocol. In an embodiment, physical data bus 108 is a Controller Area Network (CAN) bus.

Figure 2:
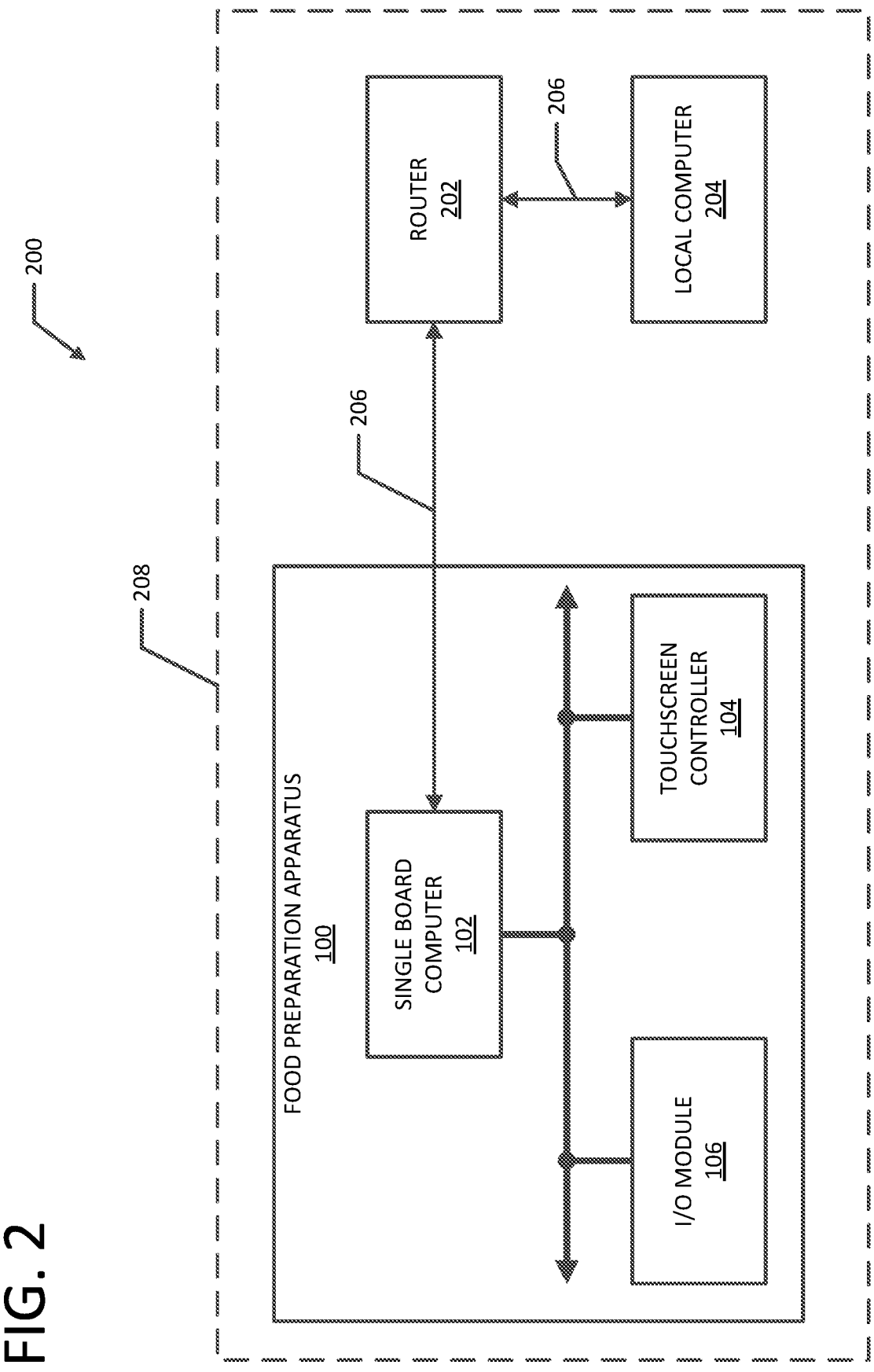
FIG. 2 is a diagram of a network system embodying aspects of the present invention.

FIG. 2 illustrates one embodiment of a network system embodying aspects of the present invention, designated generally at 200. The system 200 includes the food preparation apparatus 100, a router 202, and a local computer 204 communicatively coupled via communications network 206. In an embodiment, food preparation apparatus 100, router 202, and local computer 204 comprise the same local area network (LAN) and are not accessible over the Internet. For example, food preparation apparatus 100, router 202, and local computer 204 may all be physically located within the same food preparation establishment 208, such as a restaurant or other commercial kitchen, including a quick service or "fast food" restaurant. In an embodiment, a plurality of food preparation apparatuses 100 is communicatively coupled to the router 202 and/or local computer 204.

The router 202 is configured to communicatively couple food preparation apparatus 100 and local computer 204 on communications network 206. The local computer 204 is configured to provide a graphical user interface (GUI) to a user.

The communications network 206 is capable of facilitating the exchange of data among food preparation apparatus 100, router 202, and local computer 204 via wired and/or wireless communication protocols. The communications network 206 may include a LAN that is connectable to other telecommunications networks, including other LANs or portions of an intranet. The communications network 206 may also be any telecommunications network that facilitates the exchange of data, such as those that operate according to the IEEE 802.3 (e.g., Ethernet) and/or the IEEE 802.11 (e.g., Wi-Fi) protocols, for example. In other embodiments, the communications network 206 is any medium that allows data to be physically transferred through serial or parallel communication channels (e.g., copper wire, optical fiber, computer bus, wireless communication channel, radio frequency (RF), etc.). In an embodiment, the communications network 206 comprises at least in part a kitchen network. In another embodiment, the communications network 206 comprises at least in part a food preparation establishment network system used for "smart kitchen" purposes, as further described herein.

Commonly assigned U.S. patent application Ser. No. 17/906,096, filed Sep. 12, 2022, the entire disclosure of which is incorporated herein by reference, discloses a kitchen network system.

Commonly assigned U.S. patent application Ser. No. 18/174,044, filed Feb. 24, 2023, the entire disclosure of which is incorporated by reference, discloses a food preparation apparatus configured to communicate on a low power wireless mesh (e.g., BLE mesh) network.

Commonly assigned U.S. patent application Ser. No. 18/472,318, filed Sep. 22, 2023, the entire disclosure of which is incorporated by reference, discloses a smart food pan food system configured to communicate on a low power wireless mesh (e.g., Bluetooth mesh) kitchen network.

Commonly assigned U.S. patent application Ser. No. 18/349,372, filed Jul. 10, 2023, the entire disclosure of which is incorporated by reference, discloses a kitchen network system having a network appliance.

Commonly assigned U.S. patent application Ser. No. 17/299,823, filed Jun. 4, 2021, the entire disclosure of which is incorporated by reference, discloses a food preparation apparatus having a smart controller.

Figure 3:
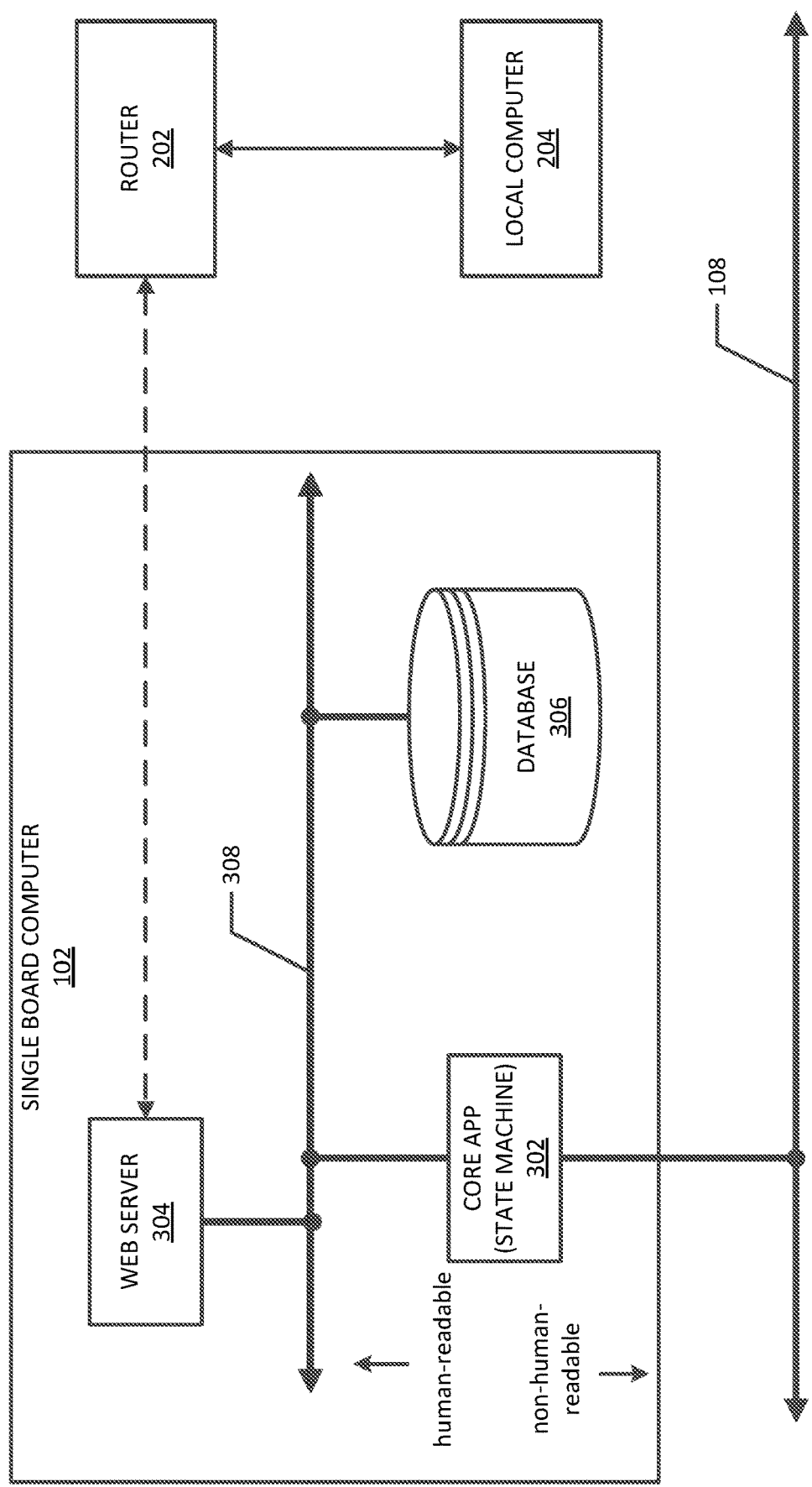
FIG. 3 is a diagram of further aspects of the network system of FIG. 2 embodying aspects of the present invention.

FIG. 3 illustrates aspects of single board computer 102 embodied in a software environment. In the illustrated embodiment, single board computer 102 includes a core application ("app") 302, a web server 304, and a database 306 communicatively coupled to each other through a virtual data bus 308. In an embodiment, core app 302, web server 304, and virtual data bus 308 are each embodied in one or more processor readable instructions stored on memory 102B and executed by processor 102A, and database 306 is comprised of processor readable instructions and/or an organized collection of data stored on memory 102B.

The core app 302, web server 304, and database 306 are configured to publish messages (e.g., data) to the virtual data bus 308 and subscribe to messages on the virtual data bus 308. In this manner, core app 302, web server 304, and database 306 are configured to communicate via a publish/subscribe protocol. The sending entity (e.g., web server 304, etc.) puts the message on the virtual data bus 308 with the identity of each intended receiver. All devices on the virtual data bus 308 continuously listen for messages addressed to them. In an embodiment, virtual data bus 308 transfers data in accordance with the Message Queue Telemetry Transport (MQTT) protocol.

The core app 302 is configured to bridge physical data bus 108 to virtual data bus 308. In an embodiment, core app 302 comprises a state machine. The core app 302 is configured to receive messages comprising recipe updates in a human-readable format on virtual data bus 308 and transmit messages comprising the recipe updates in a non-human-readable format on physical data bus 108. The web server 304 is configured to store, process, and deliver one or more web pages to local computer 204. In this manner, web server 304 provides a graphical user interface (GUI) that enables a user of a local computer 204 to configure recipe settings and/or firmware settings for food preparation apparatus 100 and/or view data regarding usage and/or fault conditions (e.g., equipment diagnostics) of apparatus 100. The database 306 is configured to store data representative of recipes and firmware.

Figure 4:
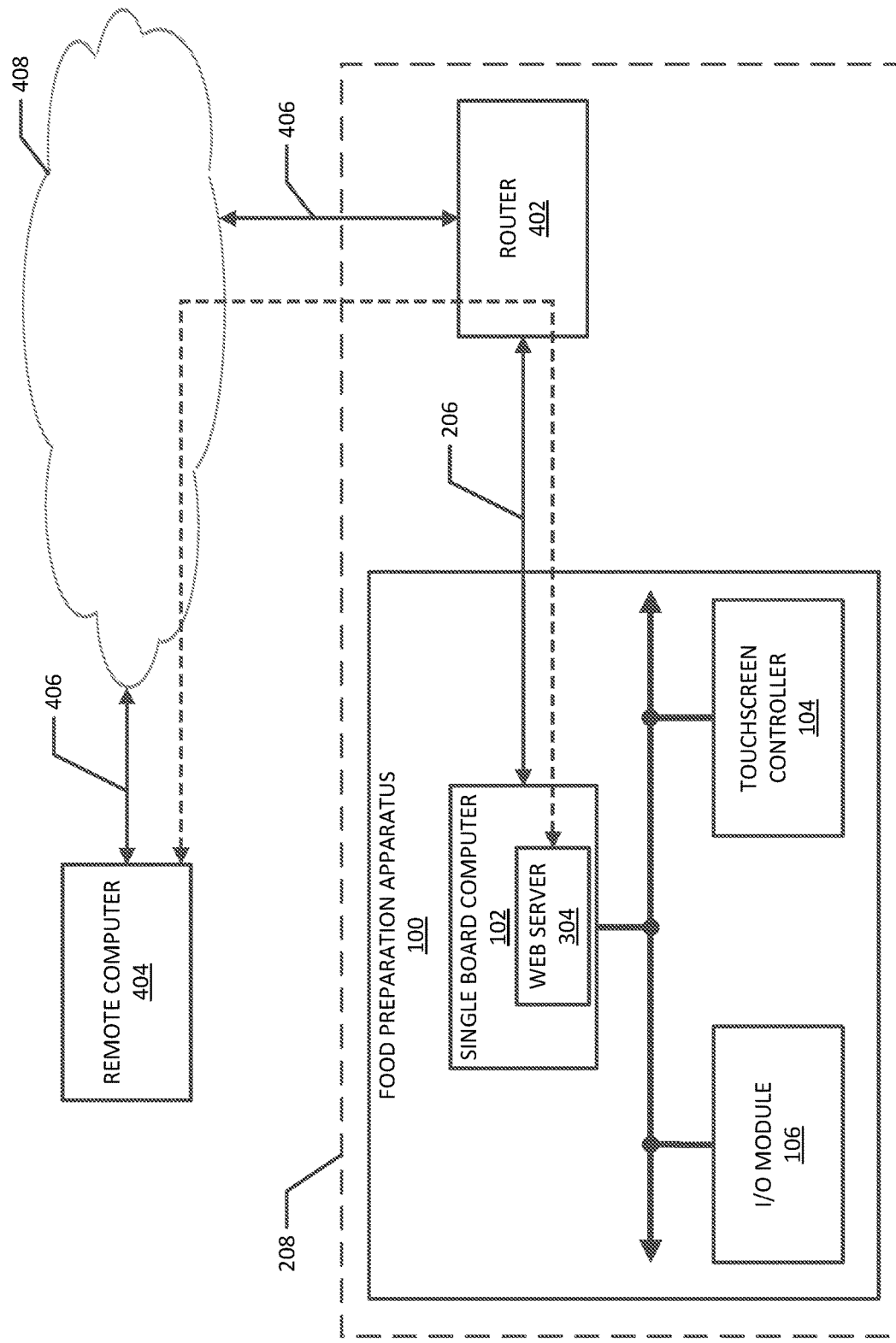
FIG. 4 is a diagram of a cloud network system embodying aspects of the present invention.

FIG. 4 illustrates another embodiment of a network system embodying aspects of the present invention, designated generally at 400. The system 400 includes the food preparation apparatus 100, a router 402, and a remote computer 404 communicatively coupled via a communications network 406. In an embodiment, the communications network 406 comprises at least in part a cloud computing environment 408. In an embodiment, food preparation apparatus 100 and router 402 comprise the same LAN and router 402 communicatively couples the LAN to remote computer 404 via a wide area network (WAN) such that remote computer 404 can access apparatus 100 (e.g., single board computer 102) over an Internet protocol (e.g., TCP/IP, etc.). For example, food preparation apparatus 100 and router 402 may be physically located within the same food preparation establishment 208 while remote computer 404 is geographically remote from the food preparation establishment 208. In an embodiment, remote computer 404 obtains access to communications network 206 via a virtual private network (VPN). In an embodiment, a plurality of food preparation apparatuses 100 (e.g., all located in the same establishment 208 or a plurality of establishments 208) are communicatively coupled to the router 402 and/or local computer 404.

The router 402 is configured to communicatively couple food preparation apparatus 100 and remote computer 404 via communications networks 206 and 406. The remote computer 404 is configured to provide a graphical user interface (GUI) to a user.

The communications network 406 is capable of facilitating the exchange of data among and between router 402 and remote computer 404. The communications network 406 may include a WAN that is connectable to other telecommunications networks, including other WANs or portions of the Internet or an intranet. The communications network 406 may also be any telecommunications network that facilitates the exchange of data, such as those that operate according to the IEEE 802.3 (e.g., Ethernet) and/or the IEEE 802.11 (e.g., Wi-Fi) protocols, for example. In other embodiments, the communications network 406 is any medium that allows data to be physically transferred through serial or parallel communication channels (e.g., copper wire, optical fiber, computer bus, wireless communication channel, etc.). In an embodiment, the communications network 406 comprises at least in part a kitchen network. In another embodiment, the communications network 406 comprises at least in part a food preparation establishment network system used for "smart kitchen" purposes, as further described herein.

Figure 5:
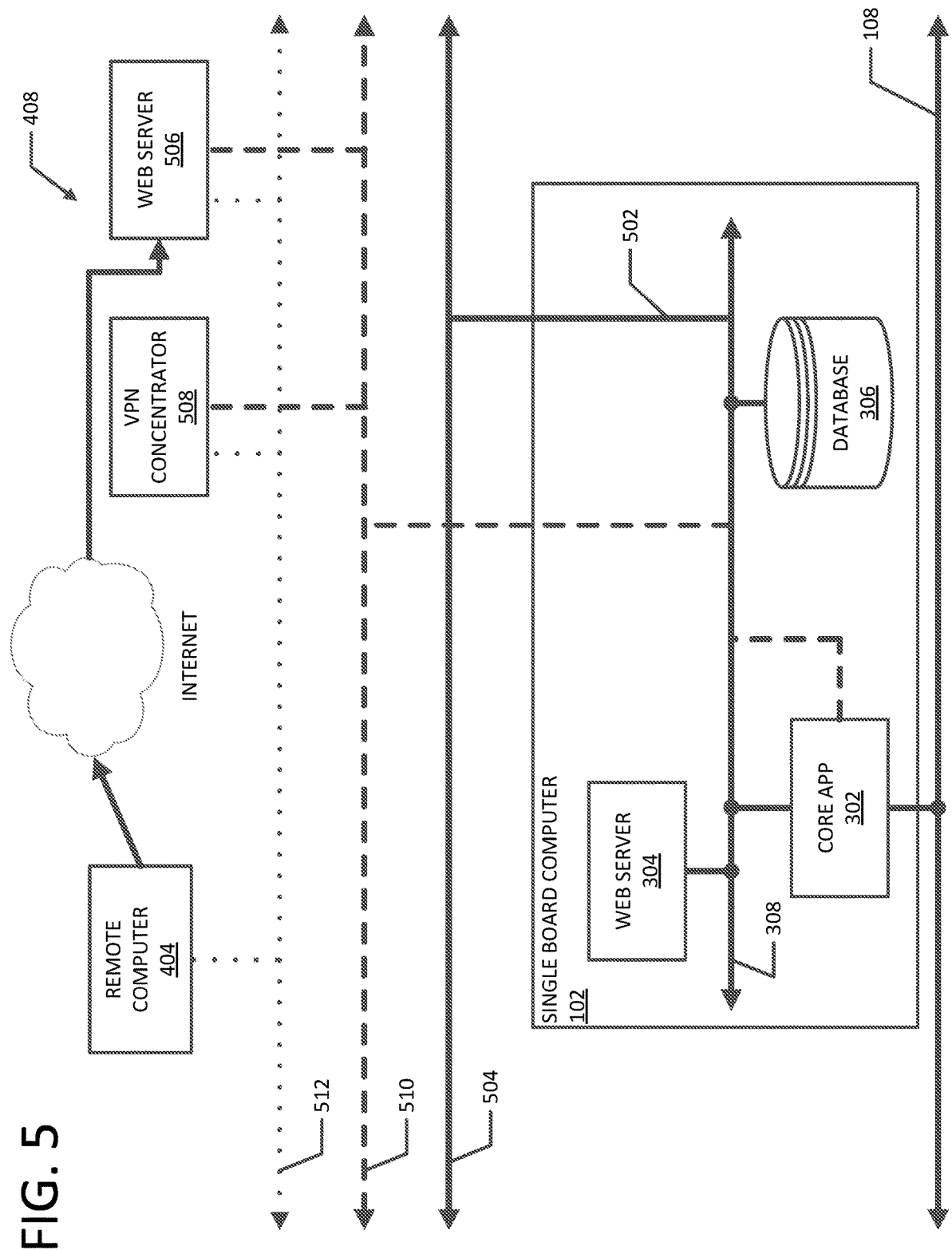
FIG. 5 is a diagram of further aspects of the cloud network system of FIG. 4 embodying aspects of the present invention.

FIG. 5 illustrates further aspects of single board computer 102 embodied in a software environment. In the illustrated embodiment, single board computer 102 includes the core app 302, the web server 304, and the database 306 communicatively coupled to each other through the virtual data bus 308. The cloud 408 includes a cloud virtual data bus 504 that is communicatively coupled to virtual data bus 308 via a bridge brokered bus 502. In an embodiment, the cloud virtual data bus 504 transfers data in accordance with a publish-subscribe messaging protocol, such as the Message Queue Telemetry Transport (MQTT) protocol, for example. The cloud 408 also includes a cloud web server 506 and a virtual private network (VPN) concentrator 508. The VPN concentrator 508 is configured to create a VPN network 510 among the cloud web server 506 and components of single board computer 102 (e.g., core app 302, web server 304, etc.) by utilizing the cloud virtual data bus 504, bridge brokered bus 502, and virtual data bus 308. In this manner, bridge brokered bus 502 comprises a secure tunnel between cloud virtual data bus 504 and virtual data bus 308. In an embodiment, remote computer 404, cloud web server 506, and VPN concentrator 508 communicate on a common subnet 512. In this manner, web server 304 provides a graphical user interface (GUI) that enables a user of remote computer 404 to configure recipe settings and/or firmware settings for food preparation apparatus 100 and/or view data regarding usage and/or fault conditions of apparatus 100.

In an embodiment, software executing on the single board computer 102 connects virtual data bus 308 to cloud virtual data bus 504. In an aspect, all data (e.g., operations updates, usage data, fault conditions, etc.) is transferred to the relevant single board computer 102 in real-time. In this manner, no data is persisted "in the cloud." As used herein, real-time means that data is transferred between components (e.g., from remote computer 404 to single board computer 102, etc.) relatively quickly (e.g., within a short temporal period, such as within milliseconds, etc.). By communicatively coupling the virtual data bus 308 and the cloud virtual data bus 504 via the bridge brokered bus 502, the core app 302, web server 304, database 306, and remote computer 404 are configured to publish messages (e.g., data) to the combined virtual data bus and subscribe to messages on the combined virtual data bus. In this manner, core app 302, web server 304, database 306, and remote computer 404 are configured to communicate via a publish/subscribe protocol. The sending entity (e.g., remote computer 404, web server 304, etc.) puts the message on the combined virtual data bus with the identity of each intended receiver. All devices on the combined virtual data bus continuously listen for messages addressed to them.

Figure 6:
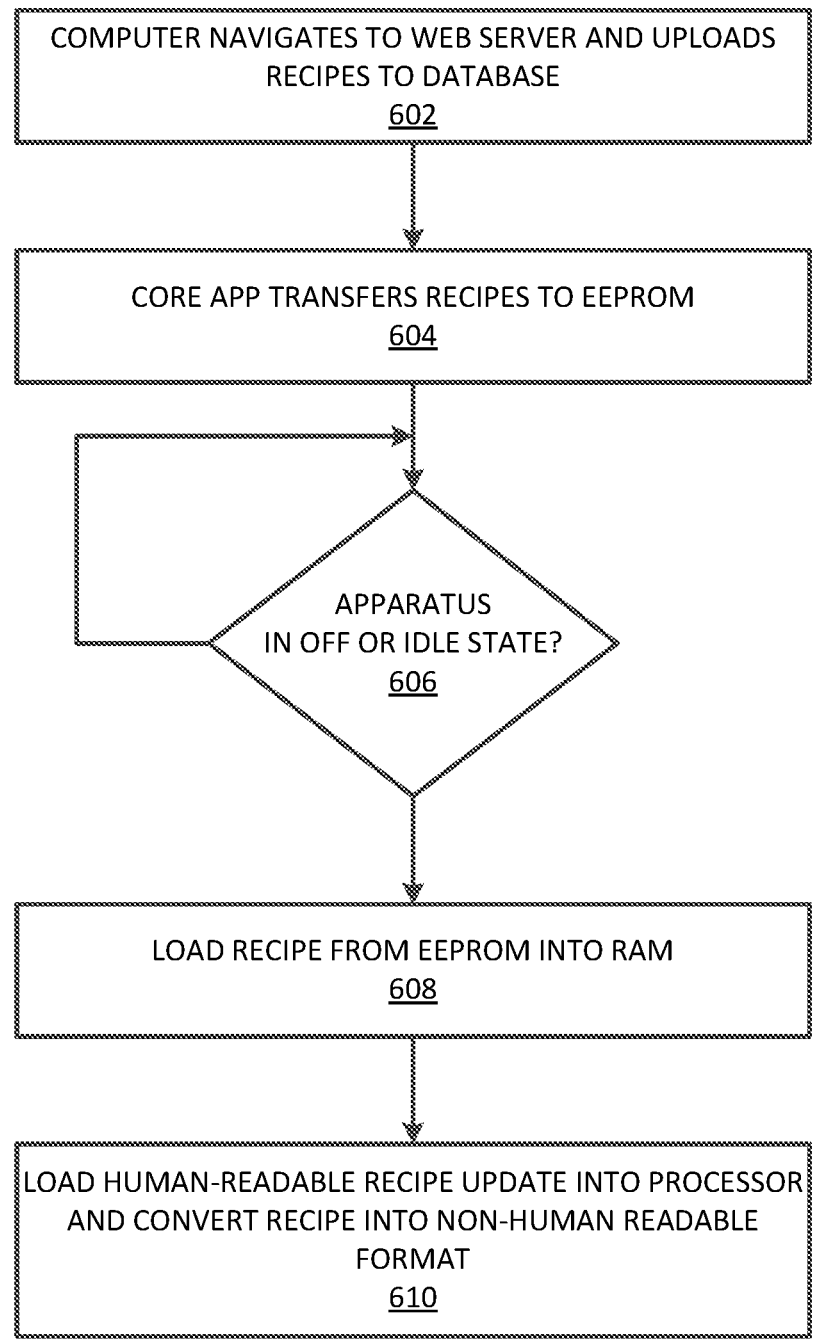
FIG. 6 illustrates an exemplary recipe update process embodying aspects of the present invention.

FIG. 6 illustrates an exemplary recipe update process performed by network system 200 and/or network system 400 in accordance with an aspect of the invention. At 602, a user of a computer (e.g., local computer 204, remote computer 404, etc.) navigates to a web server (e.g., web server 304, cloud web server 506, etc.) and uploads a whole recipe and/or recipe edits (broadly referred to as "recipe updates", more broadly "operations updates") stored on the computer to core app 302 via the GUI provided by the web server. In network system 200, local computer 204 accesses web server 304 via communications network 206 and router 202 to upload recipe updates to core app 302 via the web server and virtual data bus 308. In network system 400, remote computer 404 accesses cloud web server 506 via the Internet to upload recipe updates to core app 302 via cloud virtual data bus 504, bridge brokered bus 502, and virtual data bus 308.

In response to receiving a recipe update via the GUI provided by the web server (e.g., web server 304, web server 506, etc.), single board computer 102 transfers the recipe update to touchscreen controller 104. In an embodiment, core app 302 transfers, at 604, the recipe update to EEPROM 104D via virtual data bus 308 and physical data bus 108. During food preparation operations (e.g., baking, etc.) of apparatus 100, touchscreen controller 104 pulls recipe data from EEPROM 104D into RAM 104B. In an embodiment, pulling recipe data into RAM 104B allows for smooth, fault-tolerant apparatus operations that are unaffected from EEPROM changes while the apparatus operations are in progress. In this manner, the recipe update will appear successful to the user who initiated the update. The apparatus 100 does not need to communicate state information to the user or wait for a particular state of the apparatus for updates. Pulling recipe data into RAM 104B also allows core app 302 to send recipe updates to touchscreen controller 104 via physical data bus 108 and store it in EEPROM 104D without affecting current apparatus operations.

At 606, touchscreen controller 104 determines whether apparatus 100 is in an OFF or IDLE state. When the apparatus 100 is not in the OFF or IDLE state (i.e., apparatus 100 is in a PRE-HEAT, RUN, or DIAGNOSTIC state), the process waits until the OFF or IDLE state is entered by looping back to 606. When the apparatus 100 is in either the OFF or IDLE state, control software executing in touchscreen controller 104 (e.g., on processor 104A) loads the data storage, including any recipe updates, from EEPROM 104D into RAM 104B at 608 such that the recipes are ready for new apparatus operations. Additionally or alternatively, touchscreen controller 104 may display (e.g., via a touchscreen display device of apparatus 100) an indication of recipe updates (e.g., "Recipes Available", etc.). During the update, in one embodiment, recipes are stored only in human-readable form on the computer (e.g., local computer 204, remote computer 404, etc.), single board computer 102, EEPROM 104D, and RAM 104B. As used herein, human-readable form means a representation of data or information that can be naturally read by humans (e.g., ASCII or Unicode text, source code, etc.). When the recipe is loaded from RAM 104B to processor 104A, at 610, it is converted from human-readable form into a non-human readable form (i.e., a machine-readable form). As used herein, non-human readable form means a representation of data or information that cannot be naturally read by humans (e.g., object code, bytecode, machine code, etc.). In another embodiment, as shown in FIG. 3, the recipe updates are converted from human-readable to non-human-readable by the state machine 302. The processor 104A may be configured to convert the non-human-readable recipe updates into a human-readable format for presentation of the updates via the touchscreen display or other display. It will be appreciated that the updates can be changed from human-readable to non-human-readable, and vice versa, without departing from the scope of the present invention.

In an embodiment, firmware updates (broadly, "operations updates") for apparatus 100 are hosted on a server in the cloud (e.g., cloud 408). Unlike the recipe updates described herein, the firmware updates do not occur via a publish/subscribe protocol, although such updates could occur in that fashion. Instead, the single board computer 102 connects to the hosting server (i.e., a single point). The firmware updates can operate according to either a push model or a pull model.

FIG. 7 illustrates an exemplary GUI provided by web server 304 to a computer (e.g., local computer 204, remote computer 404, etc.) for configuring recipe settings and/or generating recipe updates and initiating a recipe update process as further described herein.

Figure 8:
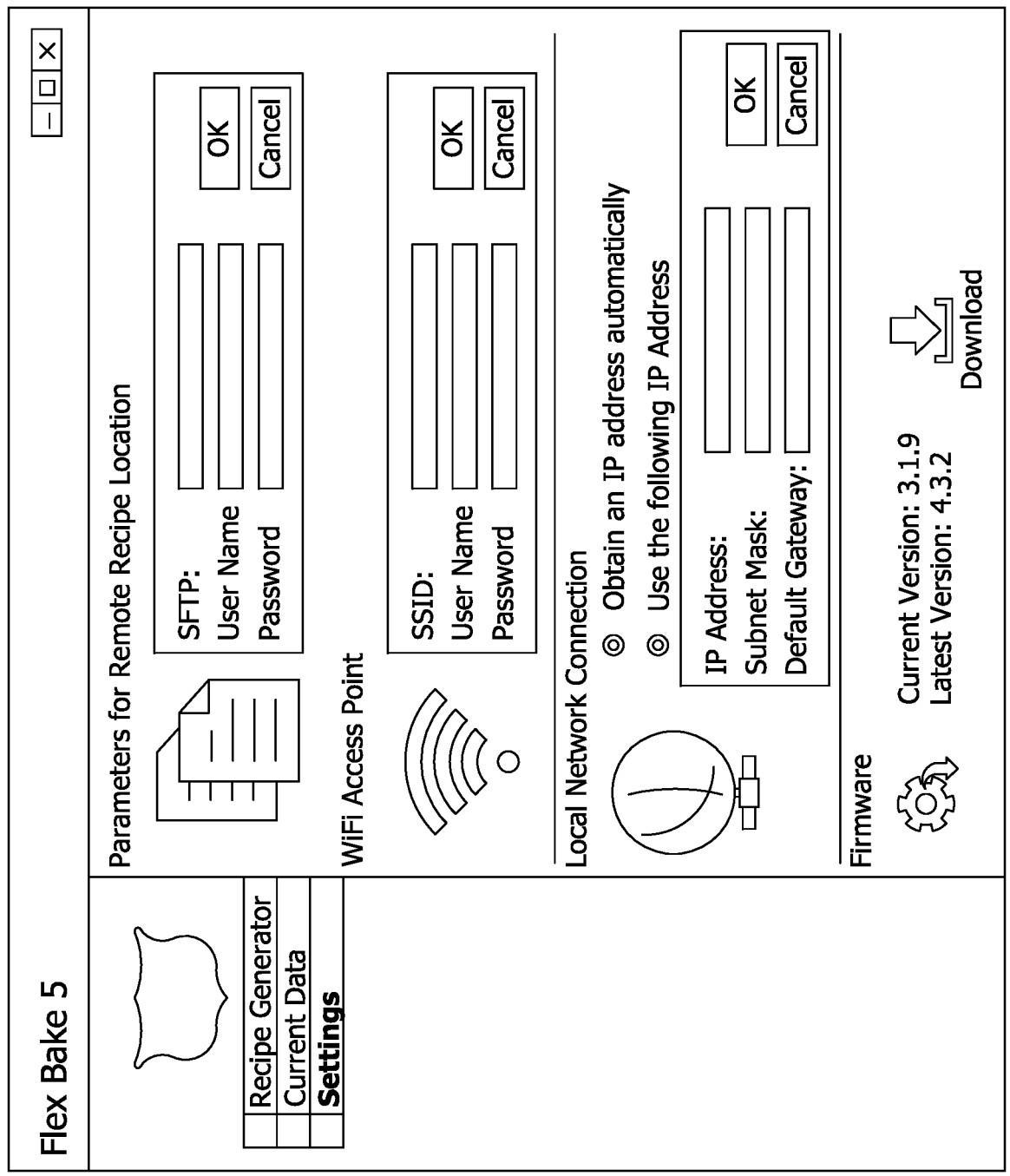

FIG. 8 illustrates an exemplary GUI provided by web server 304 to a computer (e.g., local computer 204, remote computer 404, etc.) for configuring operating and/or firmware settings of apparatus 100 as further described herein.

Figure 9:
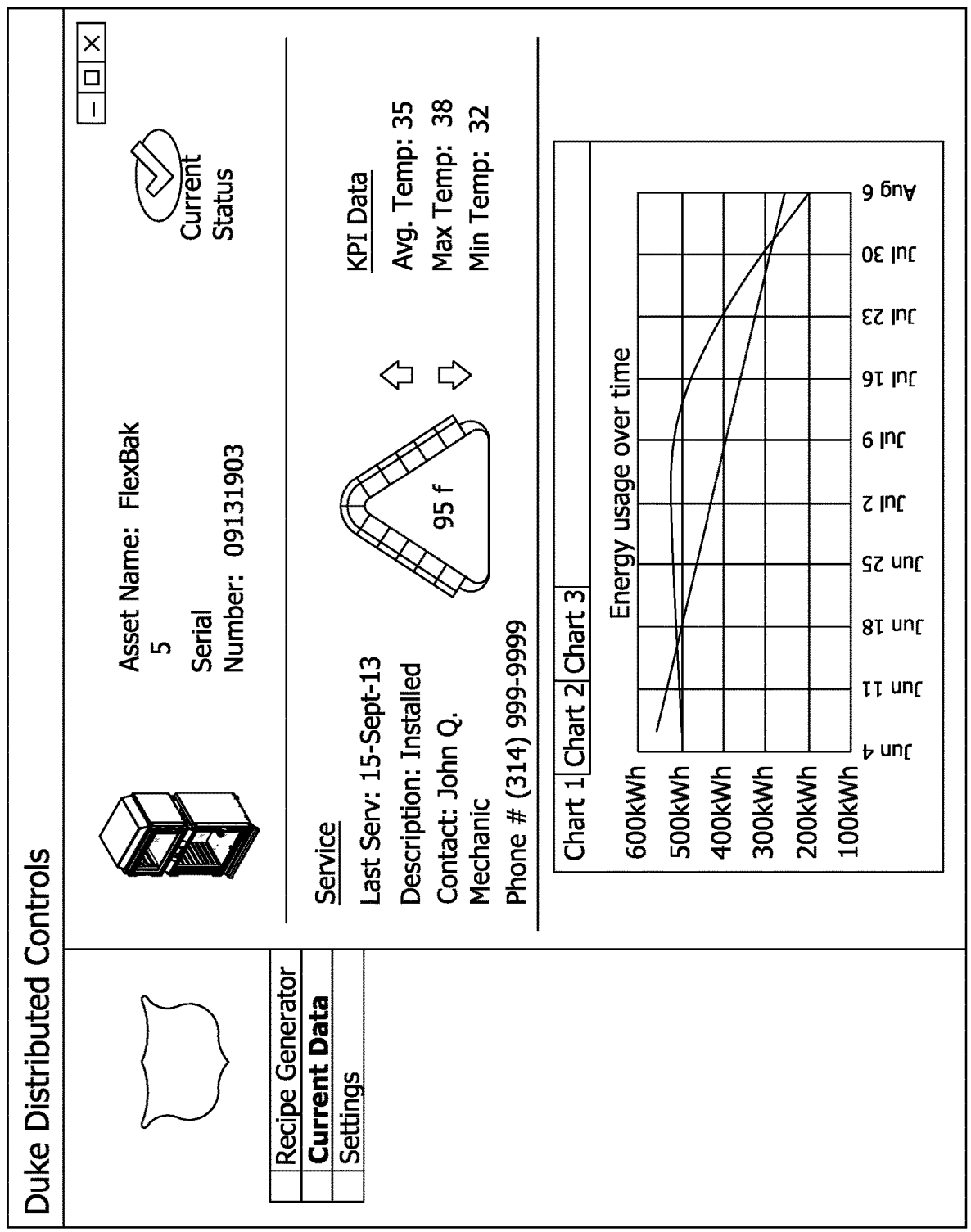

FIG. 9 illustrates an exemplary GUI provided by web server 304 to a computer (e.g., local computer 204, remote computer 404, etc.) for viewing data regarding usage and/or fault conditions of apparatus 100 as further described herein.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a general purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the invention may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A food preparation apparatus comprising:
a single board computer, comprising:
a first processor, and
a memory communicatively coupled to the first processor, the memory storing processor-executable instructions that, when executed by the first processor, provide:
a web server, and
a virtual data bus communicatively coupling the web server to a remote computer, wherein the single board computer is configured to receive one or more operations updates from the remote computer via the web server and virtual data bus; and
an operations controller communicatively coupled to the single board computer via a physical data bus, the operations controller configured to control an operation of the food preparation apparatus based on the received operations updates.

2. The food preparation apparatus of claim 1, wherein the web server is configured to receive the operations updates from at least one of a local computer or the remote computer via the virtual data bus regardless of a current functional mode of the food preparation apparatus.

3. The food preparation apparatus of claim 2, wherein the web server is configured to provide a graphical user interface to be displayed at the at least one of the local computer or the remote computer for preparing the operations updates at the at least one of the local computer or the remote computer.

4. The food preparation apparatus of claim 1, wherein the memory of the single board computer is configured to store the operations updates.

5. The food preparation apparatus of claim 1, wherein the memory stores processor-executable instructions that, when executed by the first processor, further provide a state machine, wherein the virtual data bus communicatively couples the state machine and the web server, and wherein the state machine is configured to receive the operations updates for the single board computer from the web server and the virtual data bus.

6. The food preparation apparatus of claim 5, wherein the web server is configured to enable at least one of a local computer or the remote computer to transmit the operations updates to the state machine via the virtual data bus regardless of a current functional mode of the food preparation apparatus.

7. The food preparation apparatus of claim 5, wherein the operations updates include recipe updates, and wherein the state machine is configured to receive the operations updates from the web server and transmit the recipe updates to the operations controller regardless of the current functional mode of the food preparation apparatus.

8. The food preparation apparatus of claim 7, wherein the operations controller comprises an EEPROM, and wherein the EEPROM is configured to store the recipe updates until the current functional mode of the food preparation apparatus is at least one of an off mode and an idle mode.

9. The food preparation apparatus of claim 8, wherein the operations controller further comprises a RAM and a second processor, and wherein the RAM is configured to receive and store the operations updates when the food preparation apparatus is in at least one of the off mode and the idle mode.

10. The food preparation apparatus of claim 9, wherein the second processor is configured to load the operations updates from the RAM for execution by the second processor.

11. The food preparation apparatus of claim 5, wherein the operations updates include recipe updates, and wherein the state machine is configured to bridge the virtual data bus and the physical data bus by receiving the operations updates from the web server and transmitting the recipe updates to the operations controller.

12. The food preparation apparatus of claim 1, wherein the operations updates include non-human-readable recipe updates, and wherein the operations controller comprises a second processor configured to convert the non-human-readable recipe updates into a human-readable format for presentation thereof via a display device of the apparatus.

13. A food preparation apparatus comprising:
a physical data bus;
a communications processor communicatively coupled to the physical data bus, the communications processor configured to communicate on the physical data bus via a publish/subscribe protocol; and
a first memory device communicatively coupled to the communications processor, said first memory device storing processor-executable instructions that, when executed by the communications processor:
create a virtual data bus for transmitting publish/subscribe protocol communications, and
execute a web server, wherein the web server is communicatively coupled to the virtual data bus and configured to enable at least one of a local computer or a remote computer to transmit one or more operations updates to the communications processor in the publish/subscribe protocol communications via the virtual data bus independent of a current functional mode of the food preparation apparatus.

14. The food preparation apparatus of claim 13, wherein the web server is configured to provide a graphical user interface to be displayed at the at least one of the local computer or the remote computer for preparing the operations updates at the at least one of the local computer or the remote computer to be transmitted via the publish/subscribe protocol by the virtual data bus.

15. The food preparation apparatus of claim 13, further comprising an operations processor configured to control an operation of the food preparation apparatus, the communications processor and the operations processor being communicatively coupled via the physical data bus, wherein the virtual data bus transmits the operations updates in the publish/subscribe protocol communications from the communications processor to the operations processor via the physical data bus.

16. The food preparation apparatus of claim 15, further comprising a single board computer, the single board computer including the communications processor and the first memory device.

17. The food preparation apparatus of claim 16, further comprising a touchscreen controller, the touchscreen controller including the operations processor.

18. The food preparation apparatus of claim 17, further comprising a second memory device communicatively coupled to the operations processor, the second memory device configured to store the operations updates in the publish/subscribe protocol communications received via the virtual data bus regardless of a current functional mode of the food preparation apparatus.

19. The food preparation apparatus of claim 18, further comprising a third memory device communicatively coupled to the operations processor, the third memory device configured to receive and store the operational updates from the second memory device when the food preparation apparatus is in a least one of an off mode and an idle mode.

20. The food preparation apparatus of claim 15, the communications processor communicatively coupled to the physical data bus via a first data bus interface, and the operations processor communicatively coupled to the physical data bus via a second data bus interface.

21. The food preparation apparatus of claim 13, wherein the first memory device stores processor-executable instructions that, when executed by the communications processor, provide a database communicatively coupled to the virtual data bus.

22. The food preparation apparatus of claim 13, wherein the first memory device stores processor-executable instructions that, when executed by the communications processor, execute a state machine configured to bridge the virtual data bus and the physical data bus for transmitting the publish/subscribe protocol communications from the virtual data bus to the physical data bus.

23. The food preparation apparatus of claim 22, further comprising an operations processor configured to control an operation of the food preparation apparatus, the communications processor and the operations processor being communicatively coupled via the physical data bus, the state machine configured to bridge the virtual data bus and the physical data bus for transmitting the publish/subscribe protocol communications from the virtual data bus to the operations processor via the physical data bus.

* * * * *